Sept. 19, 1944.  C. J. YOUNG  2,358,434
GAS OR LIQUID-TIGHT PLUG
Filed May 29, 1942

Inventor
Charles J. Young
By C. D. Tuska
Attorney

Patented Sept. 19, 1944

2,358,434

UNITED STATES PATENT OFFICE 2,358,434

GAS OR LIQUID-TIGHT PLUG

Charles J. Young, Ardmore, Pa., assignor to Radio Corporation of America, a corporation of Delaware Application May 29, 1942, Serial No. 445,018

3 Claims. (Cl. 220—25)

This invention relates generally to gas or liquid-tight closure devices and particularly to closure devices for providing a gas, vacuum, or liquid-tight junction between a plug and an apertured surface.

More particularly, the invention comprises a plug for an apertured surface, in which a resilient gasket is applied to the junction of the plug and the apertured surface, and a pressure device is included to exert pressure substantially normal to the base of the plug to suitably deform the gasket at the junction without providing rotational stress within the gasket. One of the many advantages of the invention is a new and improved construction in which a minimum of the gasket surface is subjected to the vacuum, liquid or gas to be sealed, whereby objectionable gassing or deterioration of the gasket is minimized.

Heretofore, plugs of the general type described herein have included suitable gaskets for the joint to be sealed, and various means have been utilized to apply pressure to the gasket to cause deformation thereof at the joint. In such devices the application of pressure to the gasket is also usually accompanied by rotational stress which injures the surface of the gasket, and prevents completely satisfactory deformation thereof for properly sealing the joint.

Among the objects of the invention are to provide a new and improved screw type plug for a threaded hole in which a resilient gasket may be deformed to effectively seal the joint between the threaded surfaces. Another object of the invention is to provide a new and improved bayonet-type plug for a suitably shaped aperture in a surface, in which a resilient gasket may be suitably deformed to provide an effective seal at the joint, and including means for effectively preventing rotation of the plug and gasket when pressure is applied to the gasket. Still another object is to provide a plug of the types described heretofore, in which rotation of the plug may be prevented by means of a simple tool, while pressure is applied to a deformable resilient gasket at the junction between the plug and the surface.

Figure 1:
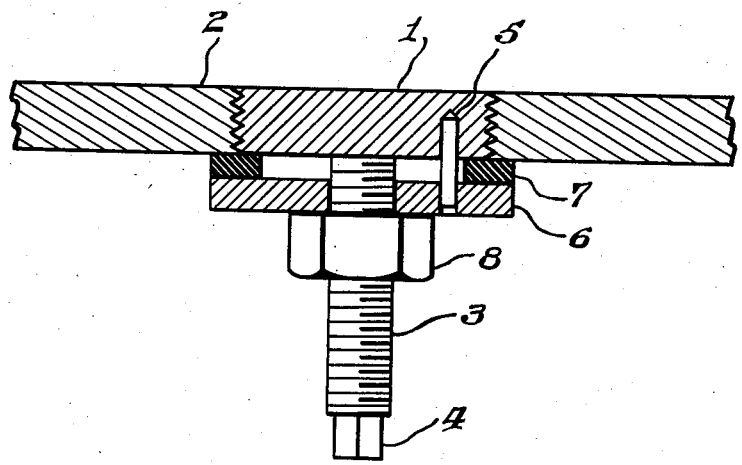
Figure 2:
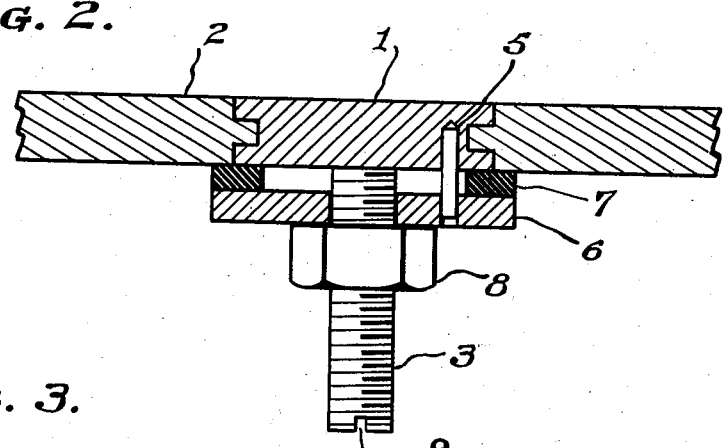
Figure 3:
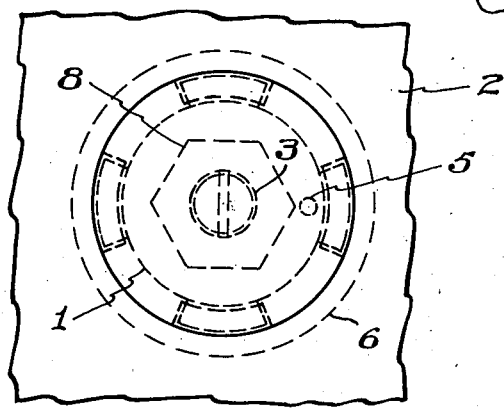

The invention will be described in greater detail by reference to the drawing of which Fig. 1 is a partial cross-sectional view of one embodiment of the invention; Fig. 2 is a partial cross-sectional view of a modification thereof; and Fig. 3 is a top view of the bayonet lock of Fig. 2. Similar reference numerals are applied to similar elements throughout the drawing.

Referring to the drawing, a plug comprising one embodiment of the invention includes a cylindrical body member 1 having threads to match the threads in an aperture of an element 2. The body member 1 includes an elongated threaded portion 3, of reduced diameter, which terminates in a square portion 4 adapted to receive a wrench. The body portion 1 of the plug is drilled to receive a pin 5 which extends from the body portion 1 parallel to, and adjacent the elongated portion 3. A compression washer 6 having clearance holes for the elongated body portion 3 and the pin 5 includes, near its periphery, a resilient gasket 7 for sealing the junction between the threaded portions of the body member 1 and the element 2. The resilient gasket may be of rubber, soft metal or other suitable deformable material, and may be cemented to the pressure washer 6. If desired, the resilient gasket may be applied to the threaded joint and the pressure washer may be separately placed in position. A nut 8, having threads to match the threads on the elongated body portion 3, is tightened against the pressure washer 6 to compress and suitably deform the resilient gasket 7. During the nut tightening operation, the body member 1, the resilient gasket 7, and the pressure washer 6 are prevented from rotating by means of a wrench, not shown, applied to the square portion 4 of the elongated threaded portion 3.

Fig. 2 is similar to the device of Fig. 1 with the exception that a conventional bayonet type joint (shown in Fig. 3) is provided between the body member 1 and the element 2 and a slot 9 is substituted for the square portion 4 of the threaded portion 3. Rotation of the body member 1, the resilient gasket 7, and the pressure washer 6 is prevented by means of a tool, not shown, applied to a slot 9 in the end of the elongated threaded portion 3. A keyhole is provided in the element 2 which is of complementary shape with respect to the body member 1. The body member is inserted in the keyhole, and rotated, for example, ninety degrees, after which it is held stationary while the nut 8 is tightened against the pressure washer 6.

In either of the modifications described, rotation of the resilient gasket and pressure washer, with respect to the body portion 1 of the plug, is effectively prevented by means of the pin 5 extending from the body portion 1 through the pressure washer 6.

I claim as my invention:

1. A plug for sealing an aperture in a wall, including a cylindraceous body shaped substantially to fill said aperture, the walls of said plug and aperture interlocking to retain said plug therein, the outer surface of said plug in operative position being substantially flush with the outer surface of said wall, an elongated threaded cylindrical portion integral with said body extending outwardly therefrom and having smaller diameter than said body, a relatively small cylindrical pin extending from said body parallel to and adjacent said elongated portion, a flat resilient gasket extending across and normal to the junctions of said surface and said body and having clearance for said pin, a substantially flat washer having at least clearance holes for said elongated threaded portion and said pin and a diameter substantially greater than the largest diameter of said aperture, a nut threaded to said elongated portion to compress said gasket between said washer and said body and said surface, a free end of said elongated portion being shaped to receive a tool to prevent rotation of said body, the pin in said body cooperating with said washer to prevent rotation of said washer, whereby the gasket clamped between said washer and said body is held stationary when said nut is tightened against said washer.

2. A plug for sealing an aperture in a wall, including a cylindraceous body shaped substantially to fill said aperture, the walls of said plug and aperture being complementarily threaded to retain said plug therein, the outer surface of said plug in operative position being substantially flush with the outer surface of said wall, an elongated threaded cylindrical portion integral with said body extending outwardly therefrom and having smaller diameter than said body, a relatively small cylindrical pin extending from said body parallel to and adjacent said elongated portion, a flat resilient gasket extending across and normal to the junctions of said surface and said body and having clearance for said pin, a substantially flat washer having at least clearance holes for said elongated threaded portion and said pin and a diameter substantially greater than the largest diameter of said aperture, a nut threaded to said elongated portion to compress said gasket between said washer and said body and said surface, a free end of said elongated portion being shaped to receive a tool to prevent rotation of said body, the pin in said body cooperating with said washer to prevent rotation of said washer, whereby the gasket clamped between said washer and said body is held stationary when said nut is tightened against said washer.

3. A plug for sealing an aperture in a wall, including a cylindraceous body shaped substantially to fill said aperture, the walls of said plug and aperture having complementary bayonet fittings to retain said plug therein, the outer surface of said plug in operative position being substantially flush with the outer surface of said wall, an elongated threaded cylindrical portion integral with said body extending outwardly therefrom and having smaller diameter than said body, a relatively small cylindrical pin extending from said body parallel to and adjacent said elongated portion, a flat resilient gasket extending across and normal to the junctions of said surface and said body and having clearance for said pin, a substantially flat washer having at least clearance holes for said elongated threaded portion and said pin and a diameter substantially greater than the largest diameter of said aperture, a nut threaded to said elongated portion to compress said gasket between said washer and said body and said surface, a free end of said elongated portion being shaped to receive a tool to prevent rotation of said body, the pin in said body cooperating with said washer to prevent rotation of said washer, whereby the gasket clamped between said washer and said body is held stationary when said nut is tightened against said washer.

CHARLES J. YOUNG.